United States Patent
Cho

(10) Patent No.: US 7,504,803 B2
(45) Date of Patent: Mar. 17, 2009

(54) CHARGING METHOD FOR RECHARGEABLE BATTERIES AND DEVICE THEREFOR

(75) Inventor: Kyu-Woong Cho, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 370 days.

(21) Appl. No.: 11/020,619

(22) Filed: Dec. 22, 2004

(65) Prior Publication Data

US 2005/0134231 A1 Jun. 23, 2005

(30) Foreign Application Priority Data

Dec. 23, 2003 (KR) .................. 10-2003-0095613

(51) Int. Cl.
  *H02J 7/04* (2006.01)
  *H02J 7/16* (2006.01)
  *H02J 7/00* (2006.01)

(52) U.S. Cl. .............. 320/141; 320/139; 320/140; 320/142; 320/143; 320/144; 320/145; 320/146; 320/147; 320/148; 320/149; 320/160

(58) Field of Classification Search ......... 320/139–149, 320/160
  See application file for complete search history.

(56) References Cited

U.S. PATENT DOCUMENTS

| | | | | |
|---|---|---|---|---|
| 3,755,729 A | * | 8/1973 | Kuttner | .................. 320/153 |
| 3,938,019 A | | 2/1976 | Schmitt et al. | |
| 4,736,150 A | | 4/1988 | Wagner | |
| 5,172,044 A | * | 12/1992 | Sasaki et al. | ................ 320/160 |
| 5,442,274 A | * | 8/1995 | Tamai | ................ 320/146 |
| 5,617,007 A | * | 4/1997 | Keidl et al. | ................ 320/141 |
| 5,670,863 A | * | 9/1997 | Broell et al. | ................ 320/145 |
| 5,708,348 A | * | 1/1998 | Frey et al. | ................ 320/145 |
| 5,747,969 A | * | 5/1998 | Tamai | ................ 320/141 |
| 5,808,447 A | * | 9/1998 | Hagino | ................ 320/139 |
| 5,828,202 A | * | 10/1998 | Tamai | ................ 320/141 |
| 5,945,811 A | * | 8/1999 | Hasegawa et al. | ................ 320/141 |

(Continued)

FOREIGN PATENT DOCUMENTS

JP  61-193380  8/1986

(Continued)

OTHER PUBLICATIONS

Korean Patent Abstracts for Publication No. 1020020052511; Date of publication of application: Jul. 4, 2002, in the name of S. Lee.

(Continued)

*Primary Examiner*—Akm E Ullah
*Assistant Examiner*—Jue Zhang
(74) *Attorney, Agent, or Firm*—Christie, Parker & Hale, LLP

(57) ABSTRACT

A charging method and device for a rechargeable battery to make more stable and faster full charging possible. One embodiment of a charging method for the rechargeable battery includes charging the battery by applying a constant current, and then charging the battery by applying a constant current pulse having uniform pulse width. The charging method further includes charging the battery by applying or interrupting the constant current and then applying the dynamic constant current pulse based on a voltage across terminals of the battery.

11 Claims, 4 Drawing Sheets

U.S. PATENT DOCUMENTS 6,137,265 A * 10/2000 Cummings et al. .......... 320/133
6,459,239 B1 * 10/2002 Price .......................... 320/130
6,707,272 B1 * 3/2004 Thandiwe ................... 320/141

FOREIGN PATENT DOCUMENTS

| JP | 9-149557 | 6/1997 |
|---|---|---|
| KR | 2002-0052511 | 7/2002 |

OTHER PUBLICATIONS

Patent Abstracts of Japan Publication No. 61-193380; Publication Date: Aug. 27, 1986; in the name of Koyama.

Patent Abstracts of Japan Publication No. 09-149557; Publication Date: Jun. 6, 1997; in the name of Masuko, et al.

* cited by examiner

CHARGING METHOD FOR RECHARGEABLE BATTERIES AND DEVICE THEREFOR

CROSS REFERENCE TO RELATED APPLICATION

This application claims priority to and the benefit of Korean Patent Application No. 10-2003-0095613 filed on Dec. 23, 2003, in the Korean Intellectual Property Office, the entire contents of which are incorporated herein by reference.

BACKGROUND OF THE INVENTION (a) Field of the Invention

The present invention relates to a charging method for rechargeable batteries and a device therefor, and more particularly to a charging method for rechargeable batteries and a device therefor using a constant current and a constant current pulse.

(b) Description of the Related Art

In general, a battery which is not reusable once it is discharged is referred to as a primary battery, and a battery which is rechargeable and reusable even when it is discharged is referred to as a secondary battery.

Recently, as portable devices, such as mobile phones, portable audio devices and digital cameras, have become widespread, the demand for rechargeable batteries has rapidly increased. A rechargeable battery used for these portable devices typically requires high stability and small thickness so that the battery is convenient to carry. In addition, such rechargeable batteries require fast and full charging to provide sufficient durability.

A typical charging method for rechargeable batteries used in these portable devices is a constant current mode-constant voltage mode charging method (referred to as "CC-CV charging method" hereinafter). The CC-CV charging method is a method of charging the rechargeable battery with a constant current until the voltage of the battery is increased to near full charging potential, after which the battery is charged with a constant voltage.

Charging methods to enable more precise and faster full charging over such a CC-CV charging method have been studied. As one example of these charging methods, U.S. Pat. No. 4,736,150 discloses a method of charging the battery by applying a pulsed current having a frequency range of 0.1 to 10 Hertz to the battery at an interval of 1 ms to 9 s. This method has an advantage in that the lifetime of the battery is prolonged because the battery is charged using a current with particular amplitude and frequency. However, this method has a disadvantage in that, because the battery is charged by applying the pulsed current to the battery for the entire charging period, the charging time is long.

U.S. Pat. No. 3,938,019 discloses a method of charging the battery by applying constant current to the battery until a charging voltage of the battery reaches a predetermined voltage, after which a constant current pulse is applied to the battery. This method enables faster and fuller charging than the method disclosed in U.S. Pat. No. 4,736,150.

As a variety of portable devices having high power consumption are rapidly increasing, interest in batteries used by these devices continues to increase. Therefore, there is a need for an improved charging method and device to enable faster and more stable full charging.

SUMMARY OF THE INVENTION

In one embodiment of the present invention, the battery is first charged by applying a constant current, then by applying a constant current pulse having a predetermined pulse width during a particular period of time. The battery is then charged by applying or interrupting the constant current and then the constant current pulse is applied based on a voltage across terminals of the battery.

In an exemplary embodiment, the constant current is interrupted when the voltage across the terminals of the battery is at or above a first voltage; after which the constant current pulse is applied when the voltage across the terminals of the battery is at or below a second voltage lower than the first voltage.

In another embodiment, the battery is first charged by applying a constant current, after which the battery is charged by applying or interrupting the constant current and then a constant current pulse is applied based on a voltage across terminals of the battery. The battery is then charged by applying the constant current pulse having a predetermined pulse width during a particular period of time.

In an exemplary embodiment, the constant current is interrupted when the voltage across the terminals of the battery is at or above a first voltage, and the constant current is applied when the voltage across the terminals of the battery is at or below a second voltage lower than the first voltage.

In accordance with still another embodiment, a device for charging a rechargeable battery by applying a constant current is provided. The device includes a voltage detector, a switching device, and a charging controller. The voltage detector detects a voltage across terminals of the battery. The switching device controls application or interruption of a constant current. The charging controller controls charging of the battery by controlling the switching device based on the voltage detected by the voltage detector.

In exemplary embodiment, the charging controller controls the switching device to be turned off when the voltage detected by the voltage detector is a first voltage, and controls the switching device to be turned on when the voltage detected by the voltage detector is a second voltage lower than the first voltage.

In an exemplary embodiment, the charging device further includes a full charging detector for detecting a full charging signal. The charging controller controls charging of the battery until a full charging signal detected by the full charging detector is received.

DETAILED DESCRIPTION

Figure 1:
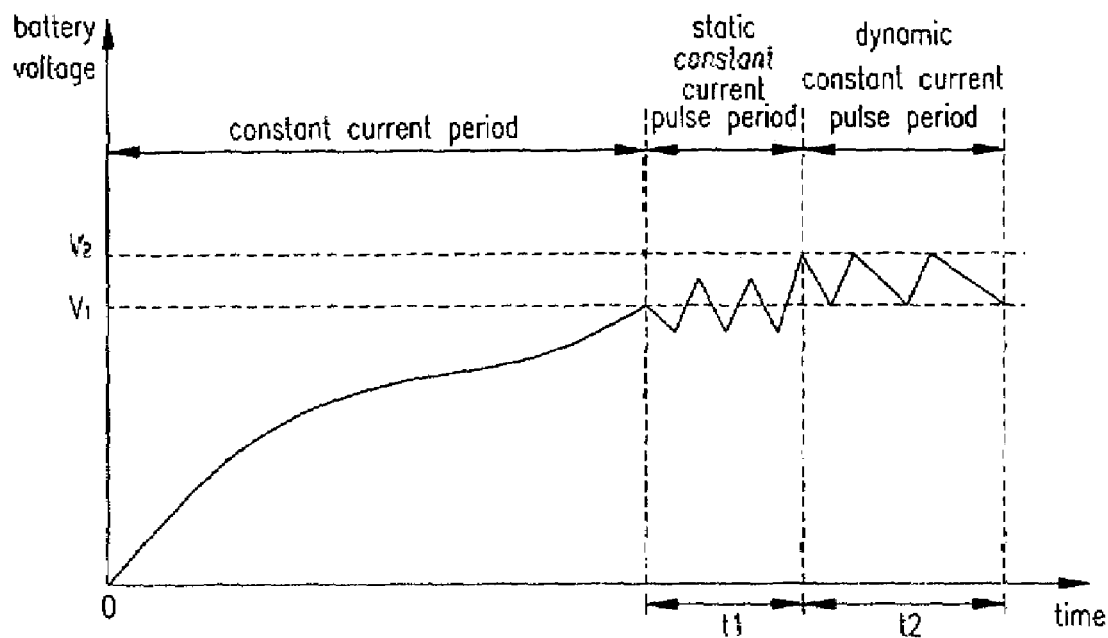
FIG. 1 is a graphical diagram showing change of a charged voltage of a rechargeable battery with time with a charging method according to an exemplary embodiment of the present invention.

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive. In the drawings, illustrations of elements having no relation with the present invention are omitted in order to clearly present the subject matter of the present invention. In the specification, the same or similar elements are denoted by the same reference numerals even though they are depicted in different drawings.

FIG. 1 is a graphical diagram showing change of a charged voltage of a rechargeable battery with time with the charging method according to a first embodiment of the present invention. The first embodiment includes a constant current period during which a constant current is applied until a voltage across terminals of the battery (referred to as "battery voltage" hereinafter) reaches a predetermined voltage V1. When the battery voltage reaches the predetermined voltage V1, a constant current pulse period begins during which a constant current pulse is applied. The constant current pulse period includes a static constant current pulse period (t1) and a dynamic constant current pulse period (t2).

Figure 2A:
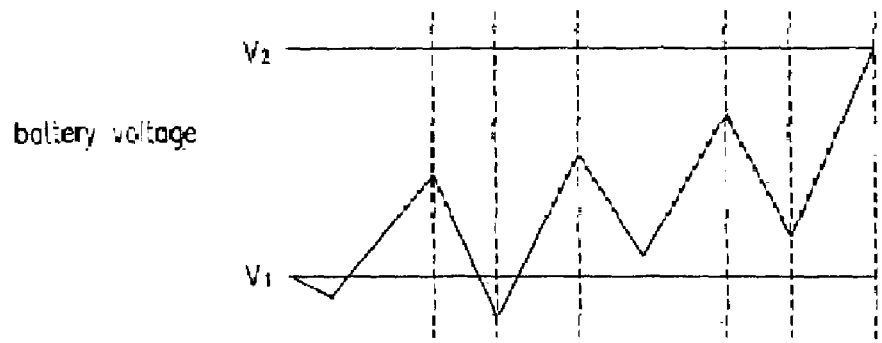
FIG. 2A is an alternate embodiment of a voltage diagram of the static constant pulse period (t1) of FIG. 1.
Figure 2B:
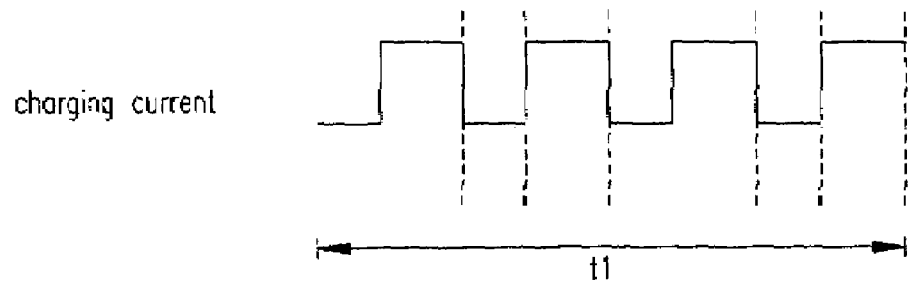
FIG. 2B is a current diagram corresponding to the voltage diagram of FIG. 2A.

FIGS. 2A and 2B show alternate voltage and current diagrams of the static constant current pulse period (t1) of FIG. 1, which is a period during which a static constant current pulse having a uniform pulse width is applied by turning off a switching device at a uniform interval irrespective of the battery voltage. The static constant current pulse period (t1) begins after the constant current period when the battery voltage reaches V1. The battery voltage during the static constant current pulse period (t1) and the charging current applied during the static constant current pulse period (t1) are shown.

When the battery voltage (FIG. 2A) reaches V1 after the constant current period, the switching device 140 (shown in FIG. 5) is turned off to interrupt the charging current (FIG. 2B) during an off time. The switching device is then turned on to apply the charging current (FIG. 2B) during an on time after the off time. The battery is charged by the charging current of a static constant current pulse type generated by repeating the off time and the on time.

Figure 3A:
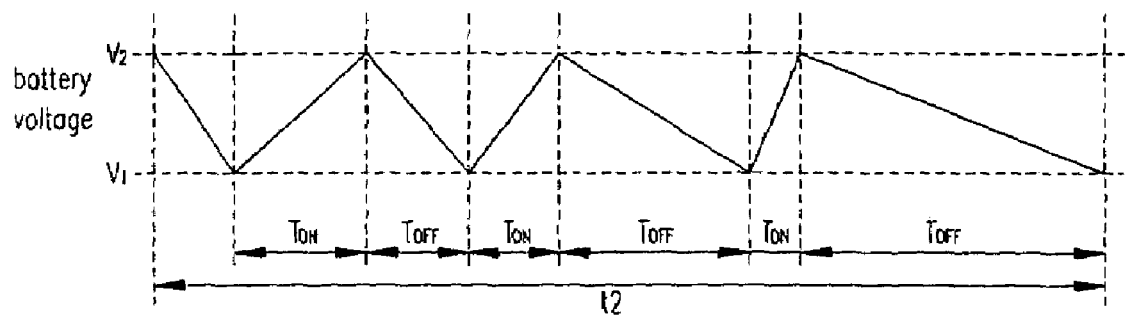
FIG. 3A is an alternate embodiment of a voltage diagram of the dynamic constant pulse period (t2) of FIG. 1.
Figure 3B:
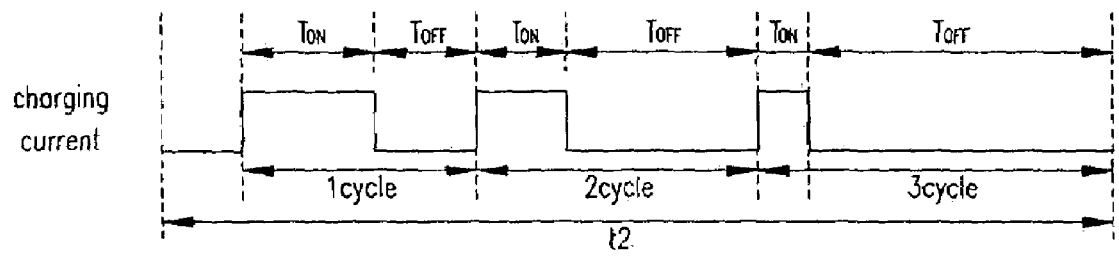
FIG. 3B is a current diagram corresponding to the voltage diagram of FIG. 3A.

Referring to FIGS. 3A and 3B, alternate voltage and current diagrams of the dynamic constant current pulse period (t2) of FIG. 1 are shown. The dynamic constant current pulse period is a period during which a dynamic constant current pulse is applied by turning on and off the switching device based on the detected battery voltage. This period begins after the static constant current pulse period (t1). When the battery voltage reaches V2 after the static constant current pulse period (t1), the dynamic constant current pulse (t2) is applied until the battery is fully charged. The battery is charged using the constant current pulse generated by turning off the switching device when the detected battery voltage is higher than V2, and turning on the switching device when the detected battery voltage is lower than V1. Namely, the battery is charged by the dynamic constant current pulse whose width is varied according to the battery voltage.

For example, when the battery voltage detected with the interval of a predetermined time is V1 or lower than V1, the switching device is turned on. And when the battery voltage detected with the interval of a predetermined time is V2 or higher than V2, the switching device is turned off.

During the dynamic constant pulse period (t2), the switching device is turned off when the battery voltage reaches V2 and the switching device is turned on when the battery voltage reaches V1. Namely, the charging current as shown in FIG. 3B is applied. At the beginning (1cycle) of the dynamic constant pulse period (t2), the period of time that the voltage takes to reach V2 ($T_{ON}$) is greater than the period of time that the voltage takes to decrease back down to V1 ($T_{OFF}$). Conversely, at the end (3 cycle) of the dynamic constant pulse period (t2), the period of time that the voltage takes to reach V2 ($T_{ON}$) is shorter than the period of time that the voltage takes to decrease back down to V1 ($T_{OFF}$). In other words, as the charging approaches full charging, the battery voltage is rapidly charged from V1 to V2 and a longer time is taken for the battery voltage to drop from V2 to V1 when the switching device is turned off. This leads to reliable and effective full charging.

Table 1, below, shows charging time measurements resulting from varying conditions of the static constant current pulse according to the first embodiment of the present invention.

TABLE 1

| Test No. | Constant current (minutes) | Static constant current pulse | | Dynamic constant current pulse t2 (minutes) | Total (minutes) |
|---|---|---|---|---|---|
| | | On/off (ms) | t1 (minutes) | | |
| 1 | 57.8 | 500/125 | 17.8 | 33.4 | 109 |
| 2 | 59.0 | 375/125 | 18.0 | 32.0 | 109 |
| 3 | 56.7 | 250/125 | 19.5 | 30.8 | 107 |
| 4 | 56.5 | 125/125 | 39.6 | 14.9 | 111 |

In Test No. 1 of Table 1, the static constant current pulse is generated by the switching device being turned on for 500 ms, and turned off for 125 ms. Similarly, in Test Nos. 2 to 4 of Table 1, the static constant current pulse is generated by the switching device being turned on for 375 ms, 250 ms and 125 ms, respectively, and turned off for 125 ms.

The constant current pulse period includes the static constant current pulse period, during which the static constant current pulse is applied, and the dynamic constant current pulse period, during which the dynamic constant current pulse is applied. By setting these periods as shown in Table 1, the charging time can be shortened.

A charging method according to a second embodiment of the present invention will be described in detail with reference to FIG. 4. This embodiment is different from the above described first embodiment in that the battery is first charged during the dynamic constant current pulse period (t2) and is next charged during the static constant current pulse (t1). Table 2 shows the charging time measured while varying conditions of the static constant current pulse according to this second embodiment of the present invention.

TABLE 2

| Test No. | Constant current (minutes) | Dynamic constant current pulse t2 (minutes) | Static constant current pulse On/off (ms) | Static constant current pulse t1 (minutes) | Total (minutes) |
|---|---|---|---|---|---|
| 1 | 57.8 | 33.4 | 500/125 | 17.8 | 109 |
| 2 | 59.0 | 32.0 | 375/125 | 18.0 | 109 |
| 3 | 56.7 | 30.8 | 250/125 | 19.5 | 107 |
| 4 | 56.5 | 14.9 | 125/125 | 39.6 | 111 |

As can be seen from Table 2, the second embodiment gives a result similar to the first embodiment. That is, the second embodiment can realize rapid charging since the charging time is shortened as in the first embodiment. Since the battery is charged during the dynamic constant current pulse by controlling the switching device according to the measured battery voltage, the battery can be charged faster and more effectively.

Figure 5:
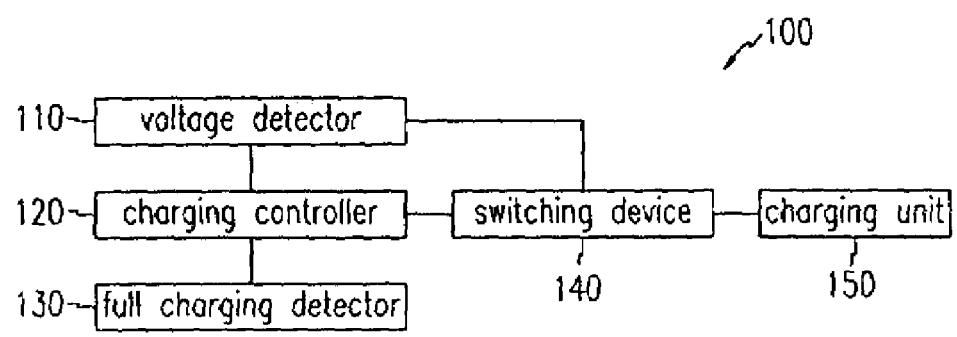
FIG. 5 is a block diagram of a configuration of a charging device according to another exemplary embodiment of the present invention.

FIG. 5 is a block diagram showing one embodiment of charging device configuration for performing the above-described charging methods according to the present invention. The charging device 100 includes a voltage detector 110 for detecting the battery voltage, a full charging detector 130 for detecting full charging, a switching device 140, a charging controller 120 for receiving a signal from the voltage detector 110 and controlling charging of the battery by controlling the switching device 140, and a charging unit 150 for charging the battery.

During the dynamic constant current pulse period (t2) of the embodiments shown in FIGS. 1, 3A, and 3B, the voltage detector 110 detects the battery voltage and transmits the detected voltage to the charging controller 120. The charging controller 120 applies the constant current to the charging unit 150 until the battery voltage becomes V2, based on the battery voltage detected by the voltage detector 110. Next, when the battery voltage detected by the voltage detector 110 becomes V2, the switching device 140 is controlled such that the constant current that is applied to the charging unit 120 is interrupted. In other words, the charging controller 120 controls the switching device 140 to be turned off when the battery voltage reaches V2 and the switching device 140 to be turned on when the battery voltage reaches V1 such that a current applied to the charging unit 150 is a dynamic constant current pulse.

After the battery is charged by applying the dynamic constant current pulse in this way, the charging controller 120 controls the charging unit 150 to terminate the charging operation upon receiving a signal representing full charging from the full charging detector 130. The full charging detector 130 may detect the full charging state when the mean of several on-times ($T_{ON}$) of the dynamic constant current pulses falls below a predetermined value. The "on-time" is the time during which the dynamic constant current is applied to the battery. The mean of on-times may be determined, for example, across the latest 10 pulses. When the full charging state is detected, the full charging detector 130 may transmit a signal representing full charging to the charging controller 120.

Figure 4:
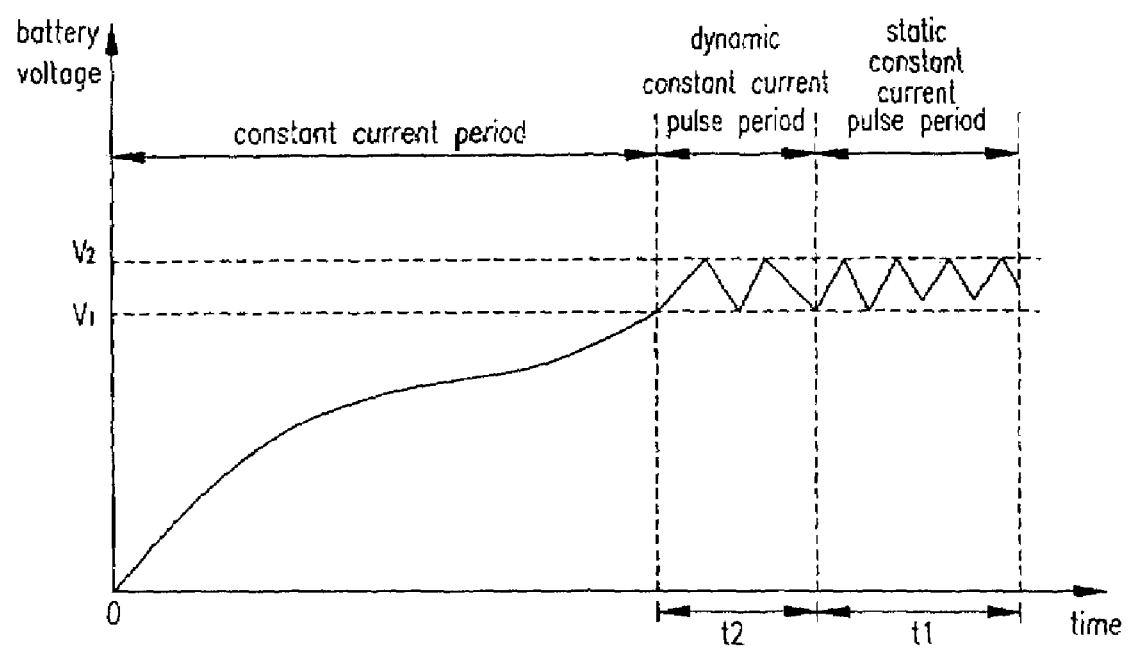
FIG. 4 is a graphical diagram showing the change in a charged voltage of a rechargeable battery with time for a charging method according to another exemplary embodiment of the present invention.

Additionally, the full charging detector 130 may detect the full charging state of the battery using any common detecting method during the dynamic constant current pulse period (t2) or the static constant current pulse period (t1) for the embodiments shown in FIGS. 1 and 4, respectively.

As is apparent from the above description, by charging the rechargeable battery by applying the constant current and the constant current pulse having the pulse width and the frequency determined based on the measured battery voltage, the rechargeable battery can be fully-charged rapidly, effectively, and more stably.

When an unexpected voltage drop occurs in the battery, errors which typically occur when the battery is charged only by the static constant current pulse having the predetermined pulse width and frequency can be prevented by charging the battery by applying the dynamic constant current pulse having the pulse width and the frequency determined based on the measured battery voltage.

While this invention has been described in connection with certain exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for charging a rechargeable battery, having a battery voltage and a voltage range comprising:

during a first stage, charging the rechargeable battery by applying a first stage constant current;

during a second stage following the first stage, charging the rechargeable battery by applying a current pulse train having a constant current level, a uniform pulse width and a uniform period of time; and during a third stage following the second stage, charging the rechargeable battery by repeating:

applying a third stage constant current when the battery voltage is less than or equal to a lowest voltage of the voltage range until the battery voltage reaches a highest voltage of the voltage range;

and interrupting the third stage constant current when the battery voltage is greater than or equal to the highest voltage of the voltage range until the battery voltage reaches the lowest voltage of the voltage range.

2. The method of claim 1, wherein during the third stage the charging comprises forming a plurality of cycles, each cycle constituting an applying period and an interrupting period.

3. The method of claim 1, wherein during the second stage the charging comprises forming a plurality of cycles, each cycle constituting an applying period and an interrupting period.

4. The method of claim 3, wherein the applying period is longer than the interrupting period.

5. A method for charging a rechargeable battery having a battery voltage and a voltage range, comprising:

during a first stage, charging the rechargeable battery by applying a first stage constant current;

during a second stage following the first stage, charging the rechargeable battery by repeating:

applying a second stage constant current when the battery voltage is less than or equal to a lowest voltage of the voltage range until the battery voltage reaches a highest voltage of the voltage range; and interrupting the second stage constant current when the battery voltage is greater than or equal to the highest voltage of the voltage range until the battery voltage reaches the lowest voltage of the voltage range; and during a third stage following the second stage, charging the rechargeable battery by applying a current pulse train having a constant current level, a uniform pulse width and a uniform period of time;

wherein the second stage constant current is maintained at a same current level during the second stage.

6. The method of claim 5, wherein during the second stage the charging comprises forming a plurality of cycles, each cycle including an applying period and an interrupting period.

7. The method of claim 5, wherein during the third stage the charging comprises forming a plurality of cycles, each cycle including an applying period and an interrupting period.

8. The method of claim 6, wherein the applying period is longer than the interrupting period.

9. A device for charging a rechargeable battery having a battery voltage and a voltage range, comprising:

a voltage detector for detecting a voltage across terminals of the rechargeable battery;

a switching device for controlling application or interruption of a constant current to the rechargeable battery; and a charging controller coupled to the switching device and the voltage detector for controlling the switching device such that:

during a first stage, the rechargeable battery is charged by applying a first stage constant current;

during a second stage following the first stage, the rechargeable battery is charged by repeating:

applying a second stage constant current when the battery voltage is less than or equal to a lowest voltage of the voltage range until the battery voltage reaches a highest voltage of the voltage range; and interrupting the second stage constant current when the battery voltage is greater than or equal to the highest voltage of the voltage range until the battery voltage reaches the lowest voltage of the voltage range; and during a third stage following the second stage, the rechargeable battery is charged by applying a current pulse train having a constant current level and a uniform pulse width and uniform period of time;

wherein the second stage constant current is maintained at a same current level during the second stage.

10. The device of claim 9, wherein the charging device further comprises a full charging detector for detecting a full charging signal, wherein the charging controller controls the switching device to charge the rechargeable battery until a full charging signal detected by the full charging detector is received.

11. A device for charging a rechargeable battery having a battery voltage and a voltage range, comprising:

a voltage detector for detecting a voltage across terminals of the rechargeable battery;

a switching device for controlling application or interruption of a constant current to the rechargeable battery; and a charging controller coupled to the switching device and the voltage detector for controlling the switching device such that:

during a first stage, the rechargeable battery is charged by applying a first stage constant current;

during a second stage following the first stage, the rechargeable battery is charged by repeating:

applying a second stage constant current when the battery voltage is less than or equal to a lowest voltage of the voltage range until the battery voltage reaches a highest voltage of the voltage range; and interrupting the second stage constant current when the battery voltage is greater than or equal to the highest voltage of the voltage range until the battery voltage reaches the lowest voltage of the voltage range; and during a third stage following the second stage, the rechargeable battery is charged by applying a current pulse train having a constant current level, a uniform pulse width and a uniform period of time;

wherein the second stage constant current is maintained at a same current level during the second stage.

* * * * *